(12) United States Patent  
Akita (10) Patent No.: US 12,403,680 B2  
(45) Date of Patent: Sep. 2, 2025

(54) DECORATIVE MATERIAL

(71) Applicant: Dai Nippon Printing Co., Ltd., Tokyo (JP)

(72) Inventor: Yasuhiro Akita, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

(21) Appl. No.: 18/694,479

(22) PCT Filed: Sep. 26, 2022

(86) PCT No.: PCT/JP2022/035692
§ 371 (c)(1),
(2) Date: Mar. 22, 2024

(87) PCT Pub. No.: WO2023/048283
PCT Pub. Date: Mar. 30, 2023

(65) Prior Publication Data
US 2024/0343028 A1 Oct. 17, 2024

(30) Foreign Application Priority Data

Sep. 24, 2021 (JP) .................. 2021-155824

(51) Int. Cl.
*B32B 3/30* (2006.01)
*B32B 27/08* (2006.01)
(Continued)

(52) U.S. Cl.
CPC .............. *B32B 27/08* (2013.01); *B32B 3/30* (2013.01); *B32B 27/16* (2013.01); *B32B 27/32* (2013.01);
(Continued)

(58) Field of Classification Search
CPC .... B32B 3/14; B32B 3/18; B32B 3/20; B32B 3/22; B32B 3/26; B32B 3/30;
(Continued)

(56) References Cited

U.S. PATENT DOCUMENTS

2022/0168992 A1* 6/2022 Usui ................. B32B 27/32

FOREIGN PATENT DOCUMENTS

| JP | H01-314168 A | 12/1989 |
| WO | 2020/203737 A1 | 10/2020 |
| WO | 2021/060530 A1 | 4/2021 |

OTHER PUBLICATIONS

JP 2000-246839 (Year: 2000).*
International Preliminary Report mailed Apr. 4, 2024, issued for PCT/JP2022/035692.

* cited by examiner

*Primary Examiner* — Elizabeth E Mulvaney
(74) *Attorney, Agent, or Firm* — Troutman Pepper Locke LLP (57) ABSTRACT

A decorative material has a first surface and a second surface opposite the first surface and includes a base material layer and a surface protection layer disposed closer to the first surface than the base material layer is. The base material layer has a plurality of grooves in a surface thereof closer to the first surface, and at least a subset of the grooves has a filled portion therein. The average specular glossiness at 85° of the first surface pursuant to JIS Z8741:1997 is 18% or less, and the standard deviation σ of the specular glossiness at 85° of the first surface pursuant to JIS Z8741:1997 is 1.0% or more.

15 Claims, 3 Drawing Sheets

(51) Int. Cl.
 *B32B 27/16* (2006.01)
 *B32B 27/32* (2006.01)
(52) U.S. Cl.
 CPC ..... *B32B 2250/02* (2013.01); *B32B 2250/242* (2013.01); *B32B 2255/10* (2013.01); *B32B 2255/26* (2013.01); *B32B 2255/28* (2013.01); *B32B 2307/4023* (2013.01); *B32B 2307/406* (2013.01); *B32B 2307/412* (2013.01); *B32B 2451/00* (2013.01)
(58) Field of Classification Search
 CPC ......... B32B 3/263; B32B 27/08; B32B 27/16; B32B 27/32; B32B 7/12; B32B 2451/00
 See application file for complete search history.

DECORATIVE MATERIAL

TECHNICAL FIELD

The present disclosure relates to decorative materials.

BACKGROUND ART

Decorative materials are used to, for example, decorate materials such as interior and exterior materials, including furniture, fixtures, and wall surfaces. Certain decorative materials have a plurality of grooves filled with ink to impart a predetermined texture.

A decorative material having ink-filled grooves can be produced through, for example, a "step of placing a 'filled portion' ink, which contains a coloring agent, on a grooved surface of a decorative material and then scraping the ink away in a predetermined direction." In the present description, this step may be referred to as "scraping" or "wiping."

When the filled portion ink, containing a coloring agent, is placed on the grooved surface of the decorative material, a subset of the grooves is filled with the ink. When the ink is scraped away, an excess of ink is removed. At the same time, the ink can be pushed into a subset of the grooves.

Examples of proposed decorative materials manufactured through scraping include those described in Japanese Unexamined Patent Application Publication No. 1-314168 and International Publication No. WO 2021/060530.

DISCLOSURE OF INVENTION

The decorative materials described in Japanese Unexamined Patent Application Publication No. 1-314168 and International Publication No. WO 2021/060530 can impart a predetermined texture. However, there is a need for a decorative material having a texture less like artificial materials, such as plastics, and more closely resembling natural materials, such as wood grain or stone grain, than that of the decorative materials described in Japanese Unexamined Patent Application Publication No. 1-314168 and International Publication No. WO 2021/060530.

An object of the present disclosure is to provide a decorative material having a texture more closely resembling natural materials.

To solve the problem described above, an embodiment of the present disclosure provides the following [1].

[1]

A decorative material having a first surface and a second surface opposite the first surface, the decorative material including:
- a base material layer and a surface protection layer disposed closer to the first surface than the base material layer is, wherein
- the base material layer has a plurality of grooves in a surface thereof closer to the first surface,
- at least a subset of the grooves has a filled portion therein, and
- an average specular glossiness at 85° of the first surface pursuant to JIS Z8741:1997 is 18% or less, and a standard deviation σ of specular glossiness at 85° of the first surface pursuant to JIS Z8741:1997 is 1.0% or more.

An embodiment of the present disclosure, furthermore, provides the following [2] to [15].

[2]

The decorative material according to [1], wherein the average specular glossiness at 85° is 1.5% or more and 18% or less.

[3]

The decorative material according to [1] or [2], wherein the standard deviation σ of specular glossiness at 85° is 1.0% or more and 7.0% or less.

[4]

The decorative material according to any of [1] to [3], wherein an average static coefficient of friction of the first surface is 1.200 or less.

[5]

The decorative material according to any of [1] to [4], wherein a standard deviation σ of static coefficients of friction of the first surface is 0.180 or more.

[6]

The decorative material according to any of [1] to [5], wherein the surface protection layer contains a matting agent.

[7]

The decorative material according to any of [1] to [6], including a primer layer between the base material layer and the surface protection layer.

[8]

The decorative material according to any of [1] to [7], wherein the base material layer includes a transparent resin layer, an adhesive agent layer, a decorative layer, and a base material in this order in a direction from the first surface toward the second surface.

[9]

The decorative material according to any of [1] to [8], wherein
- an average width of the grooves is 10 μm or more and 2000 μm or less, and
- a standard deviation of widths of the grooves is 20 μm or more and 600 μm or less.

[10]

The decorative material according to any of [1] to [9], wherein
- an average depth of the grooves is 10 μm or more and 100 μm or less, and
- a standard deviation of depths of the grooves is 1 μm or more and 20 μm or less.

[11]

The decorative material according to any of [1] to [10], wherein
- an average length of the grooves is 5 mm or more, and
- a standard deviation of lengths of the grooves is 5 mm or more.

[12]

The decorative material according to any of [1] to [11], wherein a percentage of the grooves having the filled portion is 80% or more.

[13]

The decorative material according to any of [1] to [12], further including a bonding layer disposed closer to the second surface than the base material layer is.

[14]

The decorative material according to any of [1] to [13], wherein the filled portion contains a coloring agent.

[15]

The decorative material according to any of [1] to [14], wherein the filled portion contains a matting agent.

According to the present disclosure, the texture of a decorative material can be brought closer to that of natural materials.

DESCRIPTION OF EMBODIMENTS

[Decorative Material]

A decorative material according to an embodiment of the present disclosure will be described.

A decorative material according to an embodiment of the present disclosure has a first surface and a second surface opposite the first surface, the decorative material including:
 a base material layer and a surface protection layer disposed closer to the first surface than the base material layer is, wherein
 the base material layer has a plurality of grooves in a surface thereof closer to the first surface,
 at least a subset of the grooves has a filled portion therein, and
 the average specular glossiness at 85° of the first surface pursuant to JIS Z8741:1997 is 18% or less, and the standard deviation σ of the specular glossiness at 85° of the first surface pursuant to JIS Z8741:1997 is 1.0% or more.

A decorative material according to an embodiment is a so-called "low-sheen" one. The decorative material is of low sheen owing to its low specular glossiness at 85°. By virtue of this, a texture resembling natural materials, such as wood or stone, can be imparted to the decorative material.

Figure 1:
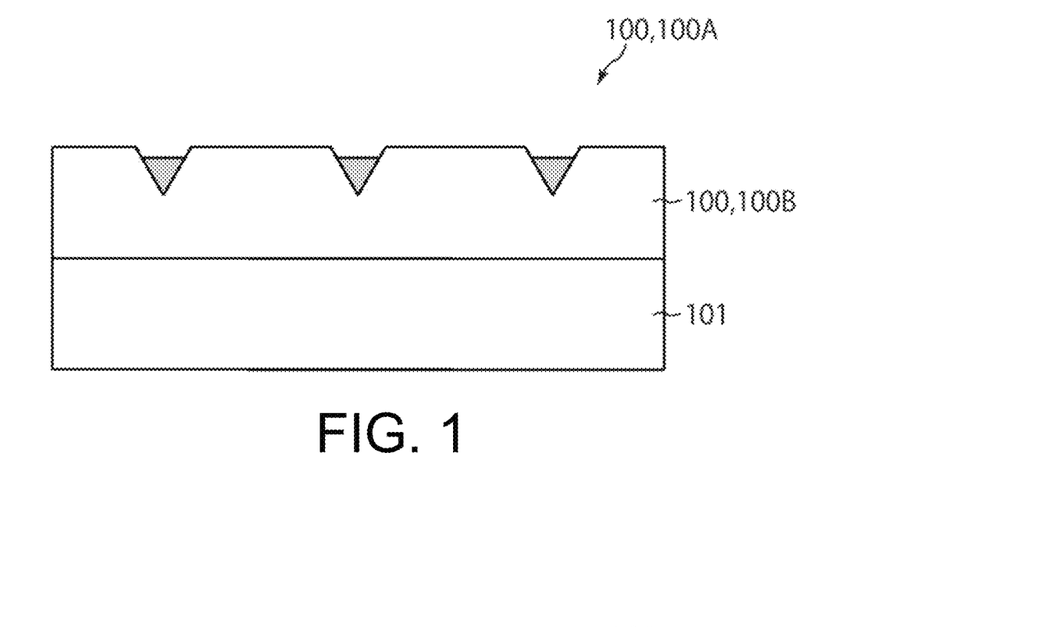
FIG. 1 is a cross-sectional view for describing a decorative material according to an embodiment of the present disclosure.

FIG. 1 is a cross-sectional view of a decorative board 100A according to an embodiment. The decorative board 100A includes a decorative sheet 100B and a substrate 101. The decorative sheet 100B is joined to the substrate 101. The decorative board 100A is a sheet-shaped component, such as a wall material or fixture. The decorative sheet 100B is, for example, a thin-film component like wallpaper or other interior material.

The substrate 101 is the adherend for the decorative sheet 100B. Examples of materials for the substrate 101 include wooden materials, including cedar, cypress, pine, lauan, and other varieties of wood, used as boards, e.g., veneer, plywood, or types of fiberboard like particle board, MDF (medium-density fiberboard), and laminated wood, three-dimensional articles, or the like; metallic materials, for example of iron or aluminum, used as boards, steel plates, three-dimensional articles, sheets, or the like; ceramic materials, including non-cement ceramic materials, such as glass, ceramics like porcelain and china, and gypsum, and non-porcelain or non-china ceramic materials, such as ALC (autoclaved lightweight aerated concrete) panels, used as boards, three-dimensional articles, or the like; and resin materials, including acrylic resins, polyester resins, poly- olefin resins, e.g., polystyrene and polypropylene, ABS (acrylonitrile-butadiene-styrene copolymer) resins, phenolic resins, vinyl chloride resins, cellulose resins, and rubbers, used as boards, three-dimensional articles, sheets, or the like.

In the present disclosure, a decorative material 100 encompasses both the decorative sheet 100B, which is used by joining it to a substrate 101, and the decorative board 100A, which includes a substrate 101 and a decorative sheet 100B joined to it. In the following embodiment, a case in which the decorative material 100 is a decorative sheet 100B, which is used by joining it to a substrate 101, will be described.

Figure 2:
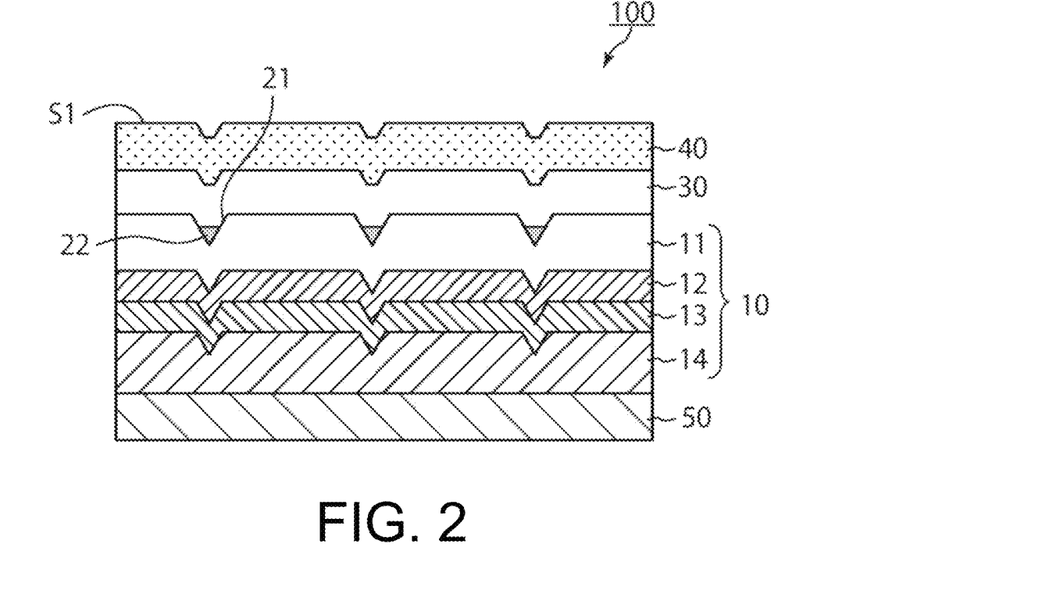
FIG. 2 is a cross-sectional view illustrating an embodiment of a decorative material according to an embodiment of the present disclosure.

FIG. 2 is a cross-sectional view illustrating an embodiment of a decorative material 100 according to the present disclosure. As illustrated in FIG. 2, the decorative material 100 has a first surface S1 and a second surface S2. Each of the first surface S1 and the second surface S2 is a main surface of the decorative material 100. The second surface S2 is opposite the first surface S1. The decorative material 100 illustrated in FIG. 2 includes a base material layer 10 and a surface protection layer 40. The surface protection layer 40 is disposed closer to the first surface S1 than the base material layer 10 is. The base material layer 10 has a plurality of grooves 21 in a surface closer to the first surface. As illustrated in FIG. 2, the grooves 21 have a filled portion 22 therein. The decorative material 100 illustrated in FIG. 2 further includes a primer layer 30 between the base material layer 10 and the surface protection layer 40. As illustrated in FIG. 2, the shape of the grooves in the base material layer 10 manifests on the surface of the primer layer 30 and the surface protection layer 40. The shape of the grooves in the base material layer 10 manifests on the first surface S1 of the decorative material 100. The decorative material 100 illustrated in FIG. 2 further includes a bonding layer 50 for joining the decorative material 100, which is a decorative sheet 100B, to a substrate 101. The bonding layer 50 is disposed closer to the second surface S2 than the base material layer 10 is in the decorative material 100.

Figure 3:
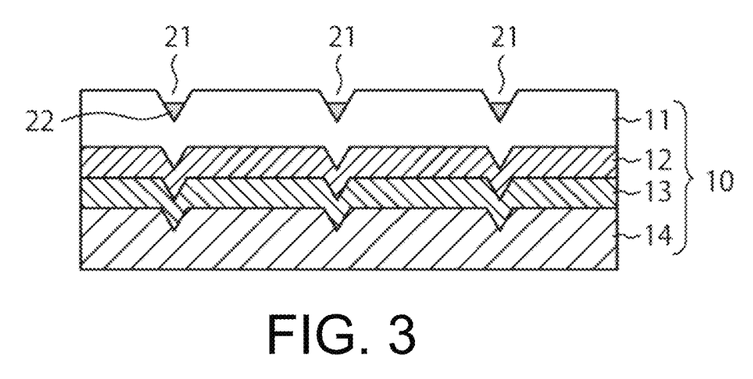
FIG. 3 is a cross-sectional view illustrating an embodiment of a base material layer that constitutes a decorative material according to an embodiment of the present disclosure.

FIG. 3 is a cross-sectional view illustrating an embodiment of a base material layer 10 that constitutes a decorative material according to the present disclosure. The base material layer 10 may have a single-layer configuration or may have a multilayer configuration as illustrated in FIG. 3, in which multiple layers are stacked together. In the example illustrated in FIG. 3, the base material layer 10 includes a transparent resin layer 11, an adhesive agent layer 12, a decorative layer 13, and a base material 14 in this order in the direction from the first surface S1 toward the second surface S2.

Figure 4:
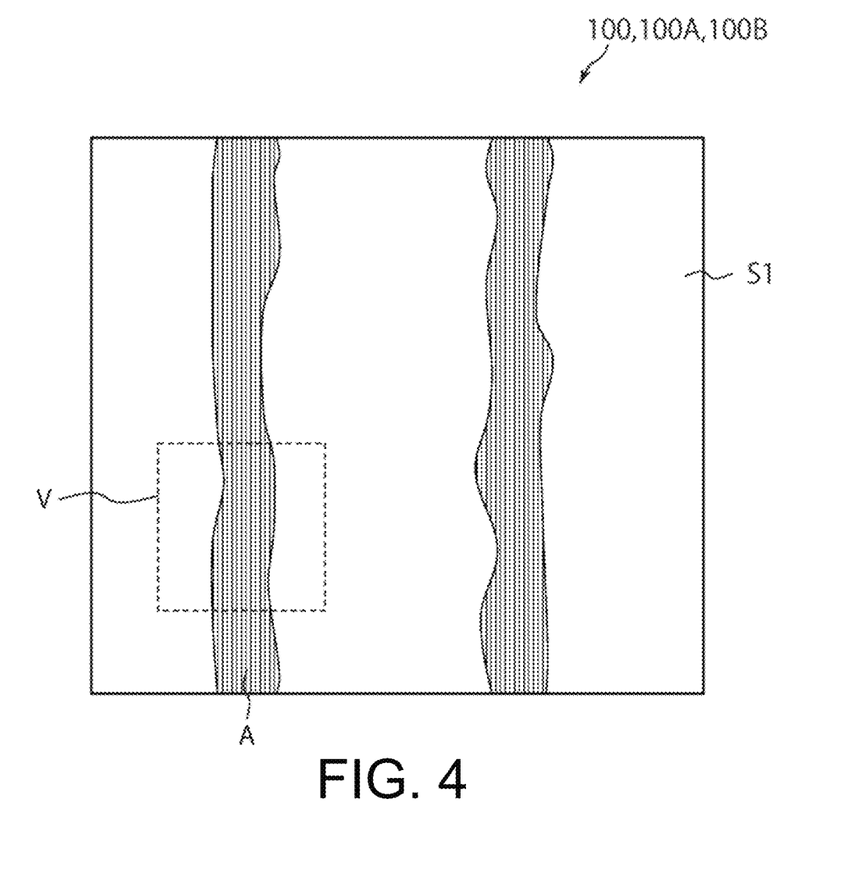
FIG. 4 is a plan view of a decorative material according to an embodiment of the present disclosure.

FIG. 4 is a plan view of the decorative material 100 according to an embodiment. In FIG. 4, the first surface S1 of the decorative material 100 is illustrated. In the example illustrated in FIG. 4, a texture of wood as a natural material has been imparted to the decorative material 100. The decorative material 100 has an imparted pattern and tactile feel of wood. The pattern of wood includes features such as yakisugi (charred timber) cracks, ducts, autumn wood, and knots. In the example illustrated in FIG. 4, a duct pattern has been formed in zone A.

Figure 5:
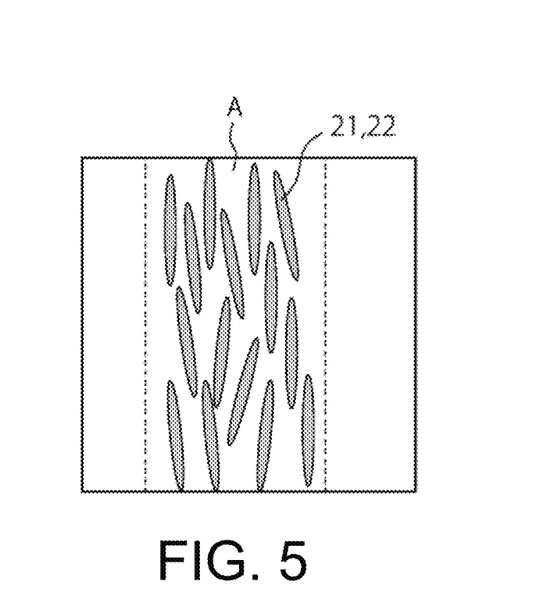
FIG. 5 is an enlarged view of the area enclosed by lines V in FIG. 4.

FIG. 5 is an enlarged view of the area enclosed by lines V in FIG. 4. In FIG. 5, the vicinity of zone A, in which a duct pattern has been formed, is illustrated as a magnified view. In zone A of the decorative material 100, grooves 21 have been created in the base material layer 10.

FIGS. 1 to 5 are schematic views for aiding in the description of a decorative material according to an embodiment of the present disclosure. The structure of the decorative material is not limited to the embodiment illustrated in FIGS. 1 to 5. A decorative material according to the present disclosure is not limited to the shape and scale in FIGS. 1 and 2.

<Specular Glossiness>

For the decorative material according to an embodiment of the present disclosure, the average specular glossiness at 85° of the first surface pursuant to JIS Z8741:1997 needs to be 18% or less. When the average specular glossiness at 85° exceeds 18%, it is difficult to achieve a texture resembling natural materials because of excessive luster.

In the present description, "specular glossiness at 85° of the first surface of a decorative material" may be referred to as "surface specular glossiness at 85° of a decorative material."

The shape of grooves manifests on the first surface of the decorative material. The specular glossiness at 85° can change more significantly with the shape of the grooves than those at 20° and 60°, presumably because it is greatly influenced by reflection from the side surfaces of the grooves. The luster of the decorative material is brought about by reflection from the first surface of the decorative material. The grooves created in the first surface of the decorative material, and the resulting low surface specular glossiness at 85° of the decorative material, reduce the luster of the decorative material and result in low sheen. A texture resembling natural materials can be imparted to the decorative material.

When the average surface specular glossiness at 85° of the decorative material is 18% or less, it can be made easier to achieve a texture resembling natural materials. When the average surface specular glossiness at 85° of the decorative material is 16% or less, it can be made easier to achieve a texture more closely resembling natural materials, and when it is 14% or less, it can be made easier to achieve a texture even more closely resembling natural materials. In certain cases, it has been difficult to achieve a texture resembling natural materials even when this average specular glossiness is 18% or less. After conducting investigations, the inventor found that the surface of the decorative material appears uniform when the standard deviation σ of the specular glossiness is small, or, in other words, when the variability in the specular glossiness is small. A uniform appearance of the decorative material results in a texture of the decorative material closely resembling artificial materials. Natural materials tend to have a great variability in the specular glossiness due to uneven surface profiles. After extensive research, the inventor discovered that a texture resembling natural materials can be achieved by ensuring that the average of the aforementioned specular glossiness is 18% or less while the standard deviation σ of the specular glossiness is 1.0% or more. By making the standard deviation σ of specular glossiness 1.5% or more, the texture can be made closer to that of natural materials, and by making it 2.0% or more, the texture can be made even closer to that of natural materials. When the standard deviation σ of the specular glossiness is less than 1.0%, the texture is apt to be like that of artificial materials even if the average specular glossiness is 18% or less.

When the average surface specular glossiness at 85° of the decorative material is excessively small, the texture of the decorative material can be like that of artificial materials due to low reflected light. The average specular glossiness is preferably 1.5% or more, more preferably 2.0% or more, even more preferably 2.5% or more.

When the standard deviation σ of the surface specular glossiness at 85° of the decorative material is excessively large, the decorative material can appear spotted. The standard deviation σ of the specular glossiness is preferably 7.0% or less, more preferably 5.0% or less, even more preferably 4.0% or less.

In the present description, the average surface specular glossiness at 85° of a decorative material and the standard deviation σ of the surface specular glossiness at 85° of the decorative material are those calculated from specular glossiness at 85° measured at 20 points on the surface of the decorative material. The 20 measuring points consist of 10 in the width direction and 10 in the longitudinal direction with respect to the decorative material. The measuring points form a crisscross or L-shape along the width and longitudinal directions with respect to the decorative material. When the decorative material is roll-shaped, the direction along the width of the roll can be chosen as the width direction, and the direction perpendicular to it as the longitudinal direction. When the decorative material is rectangular, the direction in which one of the two pairs of opposite sides extend can be chosen as the width direction, and the direction in which the other extends as the longitudinal direction. The inventor specifies the directions as described above because in JIS Z8741:1997, the specular glossiness at 85° is measured using parallel rays of light. The measuring rays of light are parallel with the direction along the length of the decorative material.

The specular glossiness at 85° is a value measured using a gloss meter ("Micro-Gloss: Cat. No 4563," manufactured by BYK-Gardner GmbH) according to method 1 described in JIS Z8741:1997.

To ensure that the average surface specular glossiness at 85° of the decorative material and the standard deviation σ of the surface specular glossiness at 85° of the decorative material fall within the ranges specified above, examples of means include setting the percentage of grooves, for instance, in the base material layer within a predetermined range and setting the matting agent content, for instance, of the surface protection layer within a predetermined range. Specific methods for adjusting the average specular glossiness and the standard deviation σ of specular glossiness will be described later herein.

<Coefficient of Friction>

For the decorative material according to an embodiment of the present disclosure, it is preferred that the average static coefficient of friction of its first surface be 1.200 or less. By ensuring that this average static coefficient of friction is 1.200 or less, a tactile feel resembling natural materials can be imparted. When the average static coefficient of friction of the first surface of the decorative material is 1.000 or less, a tactile feel more closely resembling natural materials can be imparted, and when it is 0.850 or less, a tactile feel even more closely resembling natural materials can be imparted.

In the present description, "static coefficient of friction of the first surface of a decorative material" may be referred to as "surface static friction coefficient of a decorative material."

When the surface static friction coefficient of the decorative material is excessively small, the tactile feel can be like that of artificial materials due to a slippery feel. The average static coefficient of friction, therefore, is preferably 0.300 or more, more preferably 0.400 or more, even more preferably 0.500 or more.

When the standard deviation σ of the surface static friction coefficients of the decorative material is small, or, in other words, when the variability in the surface static friction coefficient of the decorative material is small, the tactile feel of the surface of the decorative material is uniform. A uniform tactile feel of the surface of the decorative material results in a tactile feel of the decorative material closely resembling artificial materials. Natural materials tend to have a great variability in surface static friction coefficient due to uneven surface profiles. Preferably, the standard deviation σ of the surface static friction coefficients of the decorative material is large so that the tactile feel will resemble natural materials.

Specifically, it is preferred that the standard deviation σ of the surface static friction coefficients of the decorative material be 0.180 or more. By ensuring that this standard deviation σ of static coefficients of friction is 0.180 or more, it can be made easier to impart a tactile feel resembling natural materials. By making the standard deviation σ of the surface static friction coefficients of the decorative material 0.190 or more, it can be made easier to impart a tactile feel more closely resembling natural materials, and by making it 0.200 or more, it can be made easier to impart a tactile feel even more closely resembling natural materials.

When this standard deviation σ of static coefficients of friction is excessively large, a tactile feel resembling natural materials is unlikely to be achieved. The standard deviation σ of static coefficients of friction is preferably 0.300 or less, more preferably 0.290 or less, even more preferably 0.280 or less.

In the present description, the average static coefficient of friction and the standard deviation σ of static coefficients of friction are those calculated from the static coefficient of friction measured at 20 randomly selected points on the surface of the decorative material. At the 20 measuring points, the static coefficient of friction was measured in random directions.

The static coefficient of friction is a value measured as directed in JIS P8147:2010, using a friction meter (Shinto Scientific Co., Ltd.'s portable friction meter "3D Muse TYPE: 37i") with nitrile rubber attached to the measuring surface of the slider of the friction meter. The attachment of nitrile rubber to the slider is for simulating friction with human fingers. The slider of the friction meter is a hard chromium-plated aluminum column with a diameter at its bottom of 26 mm.

To ensure that the average static coefficient of friction and the standard deviation σ of static coefficients of friction fall within the ranges specified above, examples of means include setting the percentage of grooves, for instance, in the base material layer within a predetermined range and setting the matting agent content, for instance, of the surface protection layer within a predetermined range. Specific methods for adjusting the average static coefficient of friction and the standard deviation σ of static coefficients of friction will be described later herein.

<Layer Configuration>

The decorative material according to an embodiment of the present disclosure may have a bilayer configuration composed of a base material layer and a surface protection layer or may have a configuration including three or more layers. Examples of layer configurations of the decorative material include the following (A1) to (A8). In (A1) to (A8) below, "/" indicates an interface between layers. In (A1) to (A8) below, it is preferred that the layer on the (far) left form the first surface.

(A1) Surface protection layer/base material layer
(A2) Surface protection layer/primer layer/base material layer
(A3) Surface protection layer/base material layer/back primer layer
(A4) Surface protection layer/primer layer/base material layer/back primer layer
(A5) Surface protection layer/base material layer/bonding layer
(A6) Surface protection layer/primer layer/base material layer/bonding layer
(A7) Surface protection layer/base material layer/back primer layer/bonding layer
(A8) Surface protection layer/primer layer/base material layer/back primer layer/bonding layer <Base Material Layer>

The base material layer needs to have a plurality of grooves in the first surface. At least a subset of the grooves needs to have a filled portion therein.

By virtue of its base material layer having a plurality of grooves and the grooves having a filled portion therein, the decorative material according to an embodiment of the present disclosure tends to have a low specular glossiness at 85° in its regions in which the percentage by area of grooves is high and a high specular glossiness at 85° in its regions in which the percentage by area of grooves is low. For the decorative material according to an embodiment of the present disclosure, it can be made easier to ensure that the average specular glossiness at 85° and the standard deviation σ of specular glossiness at 85° fall within the ranges specified above by adjusting, for example, the percentage of grooves.

The shape of the grooves in the base material layer easily manifests on the surface of the surface protection layer (see FIG. 2). By allowing the shape of the grooves in the base material layer to manifest on the surface of the surface protection layer, it can be made even easier to ensure that the average specular glossiness at 85° and the standard deviation σ of specular glossiness at 85° fall within the ranges specified above.

The value of the static coefficient of friction tends to correlate with the area of contact between the surface and the object. By allowing the shape of the grooves in the base material layer to manifest on the surface of the surface protection layer, therefore, it can be made easier to ensure that the average static coefficient of friction and the standard deviation σ of static coefficients of friction fall within the ranges specified above.

The shape of the grooves in plan view is not particularly limited. Examples include various patterns.

When the design that the decorative material imitates as a whole is the pattern of wood, the shape of the grooves in plan view preferably forms one or more patterns selected from yakisugi (charred timber) cracks, ducts, autumn wood, and knots. "Yakisugi cracks" refer to fissures that appear perpendicular to the direction of the wood grain when the surface of a wood plank is burnt to form a carbon layer.

When the design that the decorative material imitates as a whole is the pattern of stone, such as travertine, the shape of the grooves in plan view is preferably concave.

The percentage of the area in which the grooves are present to the total area of the base material layer is preferably 50% or more and 95% or less, more preferably 60% or more and 90% or less, even more preferably 70% or more and 80% or less. By setting the percentage by area of the grooves within these ranges, it can be made easier to ensure that the average specular glossiness at 85°, the standard deviation σ of specular glossiness at 85°, the average static coefficient of friction, and the standard deviation σ of static coefficients of friction fall within the ranges specified above.

When the percentage of the area in which the grooves are present to the total area of the base material layer is excessively high, the standard deviation σ of specular glossiness at 85° and that of static coefficients of friction tend to be small because the values of specular glossiness at 85° and static coefficients of friction are likely to be uniform.

The percentage of the area in which the grooves are present in the base material layer is determined as follows. A 10-cm² square region on the surface of the base material layer is observed with a laser microscope. The percentage of the area in which grooves are present in that region is calculated. This calculation is performed at ten random points on the surface of the base material layer. The average percentage of the area in which grooves are present across the ten points is reported as the percentage of the area in which the grooves are present in the base material layer. The laser microscope used is model number VK-X1000, manufactured by Keyence Corporation.

To increase the standard deviation σ of specular glossiness at 85° and that of static coefficients of friction, it is preferred to randomly change at least one or more characteristics of the grooves from groove to groove. Examples of characteristics of the grooves include the percentage of the grooves and the width, depth, length, and direction of each groove. The preferred ranges for the percentage of the grooves are as described above. The preferred ranges for the depth, length, and direction of each groove will be described later herein. One characteristic of the grooves may be given randomness, or two or more may be given randomness.

As for the direction of each groove, the standard deviation σ of specular glossiness at 85° tends to decrease as the distribution of the directions of the grooves approaches a normal distribution. The distribution of the directions of the grooves represents the spread of the angle formed by the direction of each individual groove with a predetermined direction defined as the baseline, or 0°.

The grooves in the base material layer can be created by embossing the base material layer with an embossing plate. Even if the depth of the grooves created with an embossing plate is equal to that with another, the shape of the grooves can vary depending on the gradations that the embossing plate has. Consequently, the values of the specular glossiness at 85° and the static coefficient of friction tend to vary. The recesses of an embossing plate are created by etching corrosion or laser engraving. The recesses are usually produced in multiple steps, rather than in a single step (the recesses are formed in a stairstep-like fashion). These steps are referred to as gradations. Even if the depth of the grooves created with an embossing plate is the same, the number of gradations or standard deviation σ of gradations in the grooves created in the base material layer can differ when the number of gradations or standard deviation σ of gradations of the embossing plates is different. As a result of this, the values of the specular glossiness at 85° and the static coefficient of friction are likely to vary. By using an embossing plate with a large number of gradations or a large standard deviation σ of gradations, it can be made easier to achieve a large standard deviation σ of the specular glossiness at 85° and a large standard deviation σ of the static coefficients of friction of the decorative material because it expands the limits of the specular glossiness at 85° and static coefficients of friction that the decorative material can have.

An embossing plate with a large number of gradations or a large standard deviation σ of gradations can be produced by, for example, engraving a metal roll with laser light. Techniques for engraving a metal roll with laser light are described in, for example, International Publication No. WO 2020/203737.

The temperature and pressure during the embossing with an embossing plate can be adjusted as needed according to the material(s) used in the base material layer. When the base material and the transparent resin layer in the base material layer are made of a polyolefin, the temperature and pressure are 140° C. or above and 180° C. or below and 10 kg/cm² or more and 50 kg/cm² or less, respectively.

An example of a typical method for embossing with an embossing plate is as follows.

The embossing plate is pressed against a softened surface of the base material layer to transfer the pattern of the surface of the embossing plate. The pattern formed on the base material layer is fixed by hardening the base material layer, for example by cooling. The embossing plate is released from the base material layer to which the pattern has been transferred.

The width of each individual groove is preferably 10 μm or more and 2000 μm or less, more preferably 50 μm or more and 1800 μm or less, even more preferably 100 μm or more and 1600 μm or less. The standard deviation σ of the widths of the grooves is preferably 20 μm or more and 600 μm or less, more preferably 40 μm or more and 500 μm or less, even more preferably 60 μm or more and 400 μm or less. When the widths of the grooves meet such conditions, the texture of the decorative material can be brought closer to that of natural materials; for example, duct portions of wood can be imitated with the grooves.

The depth of each individual groove is preferably 10 μm or more and 100 μm or less, more preferably 15 μm or more and 95 μm or less, even more preferably 20 μm or more and 90 μm or less. The standard deviation σ of the depths of the grooves is preferably 1 μm or more and 20 μm or less, more preferably 2 μm or more and 18 μm or less, even more preferably 3 μm or more and 16 μm or less. When the depths of the grooves meet such conditions, the texture of the decorative material can be brought closer to that of natural materials; for example, duct portions of wood can be imitated with the grooves.

The length of each individual groove is preferably 5 mm or more, more preferably 10 mm or more, even more preferably 15 mm or more. The lengths of the grooves may extend from one longitudinal end of the decorative material to the other. The standard deviation σ of the lengths of the grooves is preferably 5 mm or more, more preferably 10 mm or more, even more preferably 15 mm or more. When the lengths of the grooves meet such conditions, the texture of the decorative material can be brought closer to that of natural materials; for example, duct portions of wood can be imitated with the grooves.

The length of each individual groove represents the longest distance between any two points within that groove. In the case of the groove illustrated in FIG. 6, the distance between points A and B is the length of the groove.

When a predetermined direction is defined as 0°, it is preferred that the direction of each individual groove be randomly selected within the range of 0° or more and 80° or less, both inclusive. When the directions of the grooves meet such conditions, the texture of the decorative material can be brought closer to that of natural materials; for example, duct portions of wood can be imitated with the grooves.

The direction of each individual groove represents the direction along which the distance between two points within the groove reaches its maximum. For example, in the case of the groove illustrated in FIG. 6, the direction along the line connecting the two points of A and B is the direction $D_1$ of the groove.

The depth of each individual groove can be calculated through the following steps B1 and B2.

Figure 6:
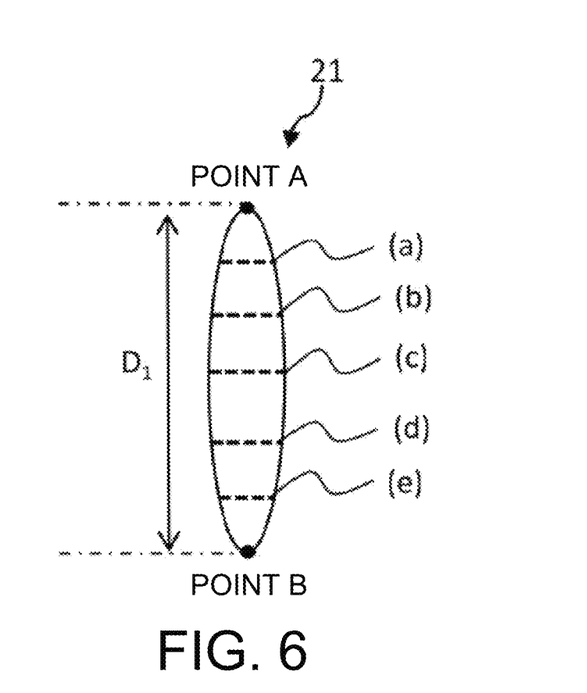
FIG. 6 is a diagram for describing a method for calculating the direction, depth, width, and length of a groove.

B1: For each groove, height data in the transverse direction is measured at five randomly selected points, and thereby five cross-sectional curves with height data are obtained. When the groove has an elongated shape in plan view, or when the groove extends in any single direction, the height data is measured perpendicular to the direction $D_1$ of the groove. For example, in the case of a groove shaped as illustrated in FIG. 6 in plan view, the height data is measured in the direction along the broken lines, which is perpendicular to the direction $D_1$ of the groove, at the five points of a to e.

B2: From the height data measured in B1, the maximum depth at each measuring point is extracted. The average maximum depth across the five points is reported as the depth of that groove.

The width of each individual groove can be calculated through, for example, C1 below.

C1: Based on the five cross-sectional curves obtained in B1 above, the width of the groove at each measuring point is calculated. The average width across the five points is reported as the width of the groove.

Among the grooves, the percentage of grooves having a filled portion is preferably 80% or more, more preferably 90% or more, even more preferably 95% or more on a number basis. When a sufficient percentage of grooves have a filled portion, the texture of the decorative material can be brought closer to that of natural materials; for example, the grooves having a filled portion can imitate duct portions of wood.

In an embodiment of the present disclosure, "grooves having a filled portion" and "grooves having no filled portion" can be discriminated as follows.

The percentage of grooves having a filled portion is determined as follows. A 10-cm² square region on the surface of the base material layer is observed for grooves, visually and with a laser microscope. Grooves with filler covering 50% or more of their area are classified as "grooves having a filled portion," and those with filler covering less than 50% of their area are classified as "grooves having no filled portion." The percentage of grooves having a filled portion to the total number of grooves in that section is calculated. This calculation is performed at ten random points on the surface of the base material layer. The average percentage of grooves having a filled portion across the ten points is reported as the percentage of grooves having a filled portion in the base material layer. The laser microscope used is model number VK-X1000, manufactured by Keyence Corporation.

The filled portion preferably contains a coloring agent. An example of means for forming a filled portion containing a coloring agent in the groove portion is applying a filled portion ink, which contains ingredients such as a coloring agent and a binder resin, to the grooved surface of the base material layer and scraping the ink away with a scraping blade, such as a doctor blade. During this, the amount of coloring agent introduced into the grooves can be adjusted by customizing parameters such as the material for the blade and the angle at which the blade is positioned. The blade is preferably made of a flexible material so that it will be easier to press the ink into the grooves. Likewise, the angle of the blade with respect to the base material layer is preferably inclined in the direction in which the blade moves on the base material layer so that it will be easier to press the ink into the grooves.

Examples of coloring agents include inorganic pigments, such as carbon black (ink black), iron black, titanium white, antimony white, chrome yellow, titanium yellow, red iron oxide, cadmium red, ultramarine, and cobalt blue, organic pigments, such as quinacridone red, isoindolinone yellow, and phthalocyanine blue, and dyes.

The coloring agent content is preferably 1 part by mass or more and 90 parts by mass or less, more preferably 2 parts by mass or more and 50 parts by mass or less, per 100 parts by mass of the binder resin.

As for the color of the coloring agent, coloring agents in dark colors are preferred for a lower average specular glossiness at 85°. With coloring agents in dark colors, the groove portion can be rendered dark, and thus the in-plane contrast in lightness of the decorative material can be enhanced. Dark colors represent low-lightness, low-chroma colors giving a dark impression, such as intense gray, deep green, navy blue, black, intense purple, dark red, and brown.

Examples of binder resins include acrylic resins, styrene resins, polyester resins, urethane resins, chlorinated polyolefin resins, vinyl chloride-vinyl acetate copolymers, polyvinyl butyral, alkyd resins, petroleum resins, ketone resins, epoxy resins, melamine resins, fluoropolymers, silicone resins, and rubber resins.

The filled portion may contain a matting agent for a texture more closely resembling natural materials.

Examples of matting agents include inorganic particles, such as silica, calcium carbonate, titanium oxide, and barium sulfate; and organic particles, such as acrylic-resin beads and styrene beads. The average particle diameter of the matting agent is preferably 1 µm or more and 20 µm or less. In the present description, the average particle diameter is identified as follows. A cross-section of the base material layer along its thickness is observed using a scanning electron microscope (SEM) at an acceleration voltage of 3.0 kV and a magnification of 20,000 to 50,000 times. One hundred of the observed matting agent particles excluding aggregates are selected randomly, and their diameter is measured. The average of the diameters of the 100 matting agent particles is identified as the average particle diameter. The diameter of each particle is measured by sandwiching the cross-section of the particle between two parallel straight lines, identifying the combination of two straight lines that maximizes the distance between the two straight lines, and measuring the distance between the two straight lines for that combination.

The matting agent content is preferably 1 part by mass or more and 30 parts by mass or less, more preferably 2 parts by mass or more and 20 parts by mass or less, per 100 parts by mass of the binder resin.

The filled portion may contain additives, such as an ultraviolet absorber, a photostabilizer, and an antioxidant.

<<Layer Configuration of the Base Material Layer>>

The base material layer may have a single-layer configuration or may have a multilayer configuration, in which a plurality of layers are stacked together. Examples of layer configurations of the base material layer include the following (D1) to (D10). In (D1) to (D10) below, "/" indicates an interface between layers. For the base material layers of (D1) to (D10) below, it is preferred that the layer on the (far) left be positioned to face the first surface. For example, the base material layer of (D8) below preferably includes the transparent resin layer, the adhesive agent layer, the decorative layer, and the base material in this order in the direction from the first surface toward the second surface.

(D1) Base material as a single layer
(D2) Decorative layer/base material
(D3) Base material/decorative layer
(D4) Transparent resin layer/base material
(D5) Transparent resin layer/decorative layer/base material
(D6) Transparent resin layer/base material/decorative layer
(D7) Transparent resin layer/adhesive agent layer/base material
(D8) Transparent resin layer/adhesive agent layer/decorative layer/base material
(D9) Transparent resin layer/decorative layer/adhesive agent layer/base material
(D10) Transparent resin layer/adhesive agent layer/base material/decorative layer —Base Material—

The base material is preferably made from a plastic film or a plastic film-paper assembly for easier creation of the grooves, for example by embossing.

Specific examples of resins that can constitute the plastic film include polyolefin resins, such as polyethylene and polypropylene, vinyl resins, such as vinyl chloride resins, vinylidene chloride resins, polyvinyl alcohol, and ethylene-vinyl alcohol copolymers, polyester resins, such as polyethylene terephthalate and polybutylene terephthalate, acrylic resins, such as polymethyl methacrylate, polymethyl acrylate, and polyethyl methacrylate, and polystyrene, acrylonitrile-butadiene-styrene copolymers (ABS resins), cellulose triacetate, and polycarbonate. Of these, polyolefin resins, vinyl chloride resins, polyester resins, and acrylic resins, which are superior in printability and shapability, are particularly preferred.

The base material may be transparent or may be colored. The base material may be a multilayer base material, which includes a plurality of layers of base material stacked together. When the base material layer has layer configuration (D6) or (D10) above, it is preferred that the base material be transparent so that the decorative layer will be visible through it.

The thickness of the base material is preferably 20 μm or more and 200 μm or less, more preferably 40 μm or more and 160 μm or less, even more preferably 40 μm or more and 100 μm or less.

One or both surfaces of the base material may undergo treatment for easier adhesion, such as a physical treatment or chemical surface treatment, for improved adhesion with the layer or layers to be placed on it.

—Decorative Layer—

The base material layer may include a decorative layer for improved aesthetics of the decorative material.

The decorative layer may be a colored layer that covers the entire surface of the layer underneath (so-called a solid-colored layer), may be a graphic layer having various patterns, or may be a combination thereof.

Examples of patterns imparted using the decorative layer include the patterns of natural materials, such as wood and stone. By forming such a pattern using a decorative layer, it can be made easier to match the pattern with the tactile feel, even when the decorative material is given a tactile feel resembling natural materials.

The decorative layer can be formed by, for example, applying a decorative layer ink, which contains a coloring agent, such as a pigment or dye, and a binder resin, and drying the applied ink. The decorative layer ink may optionally contain additives mixed into it, such as an extender pigment, an antioxidant, a plasticizer, a catalyst, a curing agent, an ultraviolet absorber, and a photostabilizer.

Examples of coloring agents include inorganic pigments, such as carbon black (ink black), iron black, titanium white, antimony white, chrome yellow, titanium yellow, red iron oxide, cadmium red, ultramarine, and cobalt blue, organic pigments, such as quinacridone red, isoindolinone yellow, and phthalocyanine blue, and dyes.

The coloring agent content is preferably 1 part by mass or more and 90 parts by mass or less, more preferably 2 parts by mass or more and 50 parts by mass or less, per 100 parts by mass of the binder resin.

Examples of binder resins include acrylic resins, styrene resins, polyester resins, urethane resins, chlorinated polyolefin resins, vinyl chloride-vinyl acetate copolymers, polyvinyl butyral, alkyd resins, petroleum resins, ketone resins, epoxy resins, melamine resins, fluoropolymers, silicone resins, and rubber resins.

The thickness of the decorative layer is preferably 0.1 μm or more and 20 μm or less, more preferably 0.5 μm or more and 10 μm or less, even more preferably 1.0 μm or more and 5.0 μm or less.

—Transparent Resin Layer—

The base material layer may include a transparent resin layer for enhanced strength.

Examples of resins that can constitute the transparent resin layer include polyolefin resins, polyester resins, polycarbonate resins, acrylonitrile-butadiene-styrene copolymers (ABS resins), acrylic resins, and vinyl chloride resins. Of these, polyolefin resins are particularly preferred in terms of workability. The transparent resin layer may be a layer of a mixture of such examples of resins or may be a stack of layers made of one or two or more of such examples of resins.

Examples of polyolefin resins for the transparent resin layer include polyethylene (low-density, medium-density, and high-density), polypropylene, polymethylpentene, polybutene, ethylene-propylene copolymers, propylene-butene copolymers, ethylene-vinyl acetate copolymers, ethylene-acrylic acid copolymers, and ethylene-propylene-butene copolymers. Of these, polyethylene (low-density, medium-density, and high-density), polypropylene, ethylene-propylene copolymers, and propylene-butene copolymers are particularly preferred, and polypropylene is more preferred.

The transparent resin layer may contain additives, such as an ultraviolet absorber, a photostabilizer, and a coloring agent. When the transparent resin layer contains an ultraviolet absorber, it is preferred that the ultraviolet absorber be a triazine compound, more preferably a hydroxyphenyltriazine compound.

The thickness of the transparent resin layer is preferably 20 μm or more and 150 μm or less for the balance between abrasion resistance, workability, and weatherability. More preferably, the thickness is 40 μm or more and 120 μm or less, even more preferably 60 μm or more and 100 μm or less.

—Adhesive Agent Layer—

The base material layer may include an adhesive agent layer for improved adhesion between layers.

The adhesive agent layer can be composed of general-purpose bonds, such as urethane bonds, acrylic bonds, epoxy bonds, and rubber bonds. Of these bonds, urethane bonds are preferred in terms of bonding strength.

Examples of urethane bonds include bonds made with two-component curing urethane resins, which include a polyol compound, such as a polyether polyol, polyester polyol, or acrylic polyol, and a curing agent, such as an isocyanate compound.

The thickness of the adhesive agent layer is preferably 0.1 µm or more and 30 µm or less so that an adequate level of adhesiveness will be achieved. More preferably, the thickness is 1 µm or more and 15 µm or less, even more preferably 2 µm or more and 10 µm or less.

<Surface Protection Layer>

The decorative material includes a surface protection layer.

The surface protection layer preferably contains the cured form of a curable resin composition to ensure good abrasion resistance of the decorative material.

Examples of curable resin compositions include thermosetting resin compositions, which contain a thermosetting resin, ionizing radiation-curable resin compositions, which contain an ionizing radiation-curable resin, and mixtures thereof. Ionizing radiation-curable resin compositions are preferred because they improve surface characteristics, such as abrasion resistance, by increasing the crosslink density of the surface protection layer. Ionizing radiation-curable resin compositions are preferred in that their instant curing nature allows the shape of the grooves created in the base material layer to easily manifest on the surface of the surface protection layer. Of ionizing radiation-curable resin compositions, electron beam-curable resin compositions are more preferred than others because they can be applied without a solvent and are easy to handle.

A thermosetting resin composition is a resin composition that contains at least a thermosetting resin and cures when heated. Examples of thermosetting resins include acrylic resins, urethane resins, phenolic resins, urea-melamine resins, epoxy resins, unsaturated polyester resins, and silicone resins. A thermosetting resin composition optionally contains an added curing agent besides a thermosetting resin.

An ionizing radiation-curable resin composition is a composition that contains a compound having an ionizing radiation-curable functional group (hereinafter also referred to as an "ionizing radiation-curable compound"). Ionizing radiation-curable functional groups are groups that crosslink and cure when irradiated with ionizing radiation, with examples of preferred ones including functional groups having an ethylenic double bond, such as a (meth)acryloyl group, a vinyl group, and an allyl group. In the present description, a (meth)acryloyl group represents an acryloyl or methacryloyl group. In the present description, a (meth)acrylate represents an acrylate or methacrylate.

Ionizing radiation refers to forms of electromagnetic waves or charged particle beams having an energy amount that can cause molecules to polymerize or crosslink. It is usually ultraviolet radiation (UV) or electron beams (EB), but electromagnetic waves such as X-rays and γ-rays as well as charged particle beams such as α-rays and ion beams are also included.

Specifically, the ionizing radiation-curable compound can be selected as appropriate from polymerizable monomers and polymerizable oligomers that have been commonly used as ionizing radiation-curable resins in the related art.

For polymerizable monomers, (meth)acrylate monomers, which have a radically polymerizable unsaturated group in their molecule, are preferred, and polyfunctional (meth) acrylate monomers are particularly preferred. "(Meth)acrylate" refers to an "acrylate or methacrylate."

An example of a polyfunctional (meth)acrylate monomer is a (meth)acrylate monomer having two or more ionizing radiation-curable functional groups in its molecule and at least a (meth)acryloyl group as the functional groups.

As for polymerizable oligomers, examples include (meth) acrylate oligomers having two or more ionizing radiation-curable functional groups in their molecule and at least a (meth)acryloyl group as the functional groups. Examples include urethane (meth)acrylate oligomers, epoxy (meth) acrylate oligomers, polyester (meth)acrylate oligomers, polyether (meth)acrylate oligomers, polycarbonate (meth) acrylate oligomers, and acrylic (meth)acrylate oligomers.

Other examples of polymerizable oligomers include polybutadiene (meth)acrylate oligomers, which are polybutadiene oligomers with a pendant (meth)acrylate group and are highly hydrophobic, silicone (meth)acrylate oligomers, which have polysiloxane bonds in their backbone, aminoplast-resin (meth)acrylate oligomers, which are modified forms of aminoplast resins, which have many reactive groups in their small molecule, and oligomers having a cationically polymerizable functional group in their molecule, such as novolak epoxy resins, bisphenol epoxy resins, aliphatic vinyl ethers, and aromatic vinyl ethers.

One such polymerizable oligomer may be used alone, or a plurality of types may be used in combination. For improved working characteristics, abrasion resistance, and weatherability, it is preferred to use one or more selected from a urethane (meth)acrylate oligomer, an epoxy (meth) acrylate oligomer, a polyester (meth)acrylate oligomer, a polyether (meth)acrylate oligomer, a polycarbonate (meth) acrylate oligomer, and an acrylic (meth)acrylate oligomer. It is more preferred to use one or more selected from a urethane (meth)acrylate oligomer and a polycarbonate (meth)acrylate oligomer, even more preferably a urethane (meth)acrylate oligomer.

An ionizing radiation-curable resin composition may also contain a monofunctional (meth)acrylate for purposes such as reducing the viscosity of the ionizing radiation-curable resin composition. One monofunctional (meth)acrylate may be used alone, or a plurality of types may be used in combination.

When the ionizing radiation-curable compound is an ultraviolet-curable compound, it is preferred that the ionizing radiation-curable resin composition contain additives including at least one photopolymerization initiator and at least one photopolymerization accelerator.

An example of the photopolymerization initiator is one or more selected from compounds such as acetophenone, benzophenone, α-hydroxyalkylphenones, Michler's ketone, benzoin, benzyl dimethyl ketal, benzoyl benzoate, α-acyl oxime esters, and thioxanthones.

Photopolymerization accelerators are compounds with which the curing rate can be increased by reducing the inhibition of polymerization by air during curing. An example is one or more selected from compounds such as isoamyl p-dimethylaminobenzoate ester and ethyl p-dimethylaminobenzoate ester.

The cured composition contained in the surface protection layer is, for example, the cured form of an acrylic resin, the cured form of a urethane resin, the cured form of a phenolic resin, the cured form of a urea-melamine resin, the cured form of an epoxy resin, the cured form of an unsaturated polyester resin, or the cured form of a silicone resin.

The surface protection layer preferably contains a matting agent.

By incorporating a matting agent in the surface protection layer, it can be made easier to reduce the likelihood of an excessively large standard deviation σ of specular glossiness at 85° because the matting agent reduces the overall surface specular glossiness of the decorative material. By incorporating a matting agent in the surface protection layer, the area of contact when the surface of the decorative material touches a given object is reduced, and it can be made easier to ensure that the average static coefficient of friction falls within the range specified above.

Examples of matting agents include inorganic particles, such as silica, calcium carbonate, titanium oxide, and barium sulfate; and organic particles, such as acrylic-resin beads and styrene beads. Of these, inorganic particles are particularly preferred. Inorganic particles are relatively prone to aggregate. The size of aggregates formed by inorganic particles is likely to be random. By using inorganic particles, it can be made easier to ensure that the standard deviation σ of specular glossiness at 85° and that of static coefficients of friction fall within the ranges specified above.

The average particle diameter of the matting agent is preferably 0.5 μm or more and 20 μm or less, more preferably 1 μm or more and 10 μm or less. With increasing average particle diameter of the matting agent, the average specular glossiness at 85° and the average static coefficient of friction tend to decrease. In the present description, the average particle diameter is identified as follows. A cross-section of the base material layer along its thickness is observed using a scanning electron microscope (SEM) at an acceleration voltage of 3.0 kV and a magnification of 20,000 to 50,000 times. One hundred of the observed matting agent particles excluding aggregates are selected randomly, and their diameter is measured. The average of the diameters of the 100 matting agent particles is identified as the average particle diameter. The diameter of each particle is measured by sandwiching the cross-section of the particle between two parallel straight lines, identifying the combination of two straight lines that maximizes the distance between the two straight lines, and measuring the distance between the two straight lines for that combination.

The matting agent content is preferably 1 part by mass or more and 30 parts by mass or less, more preferably 2 parts by mass or more and 20 parts by mass or less, per 100 parts by mass of the binder resin. With increasing matting agent content, the average specular glossiness at 85° and the average static coefficient of friction tend to decrease.

When the matting agent aggregates, the standard deviation σ of specular glossiness at 85° and that of static coefficients of friction are likely to increase. Increasing the amount of a matting agent prone to aggregate reduces the average specular glossiness at 85° and the average static coefficient of friction, but can lead to an increase in the standard deviation σ of specular glossiness at 85° and that of static coefficients of friction at the same time.

The surface protection layer may optionally contain additives, such as an ultraviolet absorber, a photostabilizer, and a coloring agent.

The thickness of the surface protection layer is preferably 1.5 μm or more and 20 μm or less for the balance between abrasion resistance and weatherability. More preferably, the thickness is 2 μm or more and 15 μm or less, even more preferably 3 μm or more and 10 μm or less.

By making the thickness 1.5 μm or more, it can be made easier to achieve good abrasion resistance. By making the thickness 20 μm or less, it can be made easier to achieve good workability. By making the thickness 20 μm or less, it can be made easier to ensure that the shape of the grooves created in the base material layer manifests on the surface of the surface protection layer.

<Primer Layer>

Between the base material layer and the surface protection layer, the decorative material may include a primer layer for better adhesion.

The primer layer is composed primarily of at least one binder resin. The primer layer may contain additives, such as an ultraviolet absorber and a photostabilizer.

Examples of preferred binder resins for the primer layer include resins such as urethane resins, acrylic polyol resins, acrylic resins, ester resins, amide resins, butyral resins, styrene resins, urethane-acrylic copolymers, polycarbonate urethane-acrylic copolymers (urethane-acrylic copolymers derived from polymers having carbonate bonds in their polymer backbone with two or more hydroxyl groups in their terminal or pendant (polycarbonate polyols)), vinyl chloride-vinyl acetate copolymer resins, vinyl chloride-vinyl acetate-acrylic copolymer resins, chlorinated propylene resins, nitrocellulose resins (nitrocotton), and cellulose acetate resins. One such resin may be used alone, or a plurality of types may be used in combination. The binder resin may be a form of such a resin as listed above crosslinked and cured with an added curing agent, such as an isocyanate curing agent or epoxy curing agent. Of such forms of resins, polyol resins, such as acrylic polyol resins, crosslinked and cured with an isocyanate curing agent are particularly preferred, and acrylic polyol resins crosslinked and cured with an isocyanate curing agent are more preferred.

The thickness of the primer layer is preferably 0.5 μm or more and 10 μm or less, more preferably 0.7 μm or more and 8 μm or less, even more preferably 1 μm or more and 6 μm or less.

<Back Primer Layer>

The decorative material according to an embodiment of the present disclosure may include a back primer layer near the second surface of the base material layer for improved adhesion between the decorative material and various adherend materials.

The material used to form the back primer layer is not particularly limited. Examples include urethane resins, acrylic resins, polyester resins, vinyl chloride/vinyl acetate copolymers, chlorinated polypropylene resins, and chlorinated polyethylene resins.

The thickness of the back primer layer is preferably 0.5 μm or more and 5.0 μm or less, more preferably 1 μm or more and 3 μm or less.

The surface protection layer, the decorative layer, the primer layer, the adhesive agent layer, and the back primer layer can be formed by applying an ink containing the composition that will form the layer by a known technique, such as gravure printing, bar coating, roll coating, reverse roll coating, or comma coating, optionally followed by drying and curing.

The transparent resin layer can be formed by, for example, hot-melt extrusion.

<Bonding Layer>

The bonding layer 50 joins the decorative material 100, which is a decorative sheet 100B, and the substrate 101 together. The bonding layer 50 can be made with a permanent or temporary adhesive agent. A permanent adhesive agent used in the bonding layer may be a known one. A permanent adhesive agent used in the bonding layer may be an adhesive agent such as a heat-sensitive or pressure-sensitive adhesive agent. The resin used in a permanent adhesive agent may be, for example, an acrylic resin, urethane resin, vinyl chloride resin, vinyl acetate resin, vinyl chloride-vinyl acetate copolymeric resin, styrene-acrylic copolymeric resin, polyester resin, or polyamide resin. A permanent adhesive agent may contain one such resin alone or may contain a plurality of types of resins. The resin used in a permanent adhesive agent may be a two-component curing polyurethane or polyester adhesive agent that includes an isocyanate compound, for example, as a curing agent. A temporary adhesive agent used in the bonding layer can be selected as appropriate from temporary adhesive agents such as acrylic, urethane, silicone, rubber, and other types.

The bonding layer 50 can be produced by processing such a resin or resins as listed above into an applicable form, such as a solution or emulsion, applying it by means such as gravure printing, screen printing, or reverse coating using a gravure plate, and drying the resulting coating. The thickness of the bonding layer may be 1 μm or more and 100 μm or less so that excellent bondability will be achieved. The thickness may be 5 μm or more and 50 μm or less or may be 10 μm or more and 30 μm or less.

<Applications of the Decorative Material>

The decorative material according to the present disclosure can be used in various applications.

Examples of applications include interior materials for buildings, such as walls, ceilings, and floors; fixtures, such as window frames, doors, and handrails; furniture; housings of equipment such as household electrical appliances and office equipment; and exterior materials, such as entrance doors. The decorative material may be used in the application of repair components for them.

EXAMPLES

The present disclosure will be described in further detail with examples. The present disclosure, however, is by no means limited to these examples. "Parts" is by mass unless stated otherwise.

1. Evaluations 1-1. Specular Glossiness at 85°

For each of the decorative materials obtained in Examples and Comparative Examples and those obtained in Reference Examples, specular glossiness at 20°, specular glossiness at 60°, and specular glossiness at 85° pursuant to JIS Z8741:1997 were measured at 20 points on the surface of the decorative material. As directed in JIS Z8741:1997, the specular glossiness at 20° is measured by method 5 in JIS Z8741:1997, the specular glossiness at 60° is measured by method 3 in JIS Z8741:1997, and the specular glossiness at 85° is measured by method 1 in JIS Z8741:1997. The decorative material was prepared as a rectangular piece of decorative material, having longer sides and shorter sides. The 20 measuring points consisted of 10 in the direction along the longer sides of the decorative material and 10 in the direction along the shorter sides of the decorative material. The measuring instrument used was "Micro-Gloss: Cat. No 4563," manufactured by BYK-Gardner GmbH. Based on the values of specular glossiness at 20°, specular glossiness at 60°, and specular glossiness at 85° at the 20 points, the average specular glossiness at 20°, the average specular glossiness at 60°, and the average specular glossiness at 85° and the standard deviation σ of specular glossiness at 20°, the standard deviation σ of specular glossiness at 60°, and the standard deviation σ of specular glossiness at 85° were calculated. The results are presented in Table 1.

1-2. Texture

For each of the decorative materials obtained in Examples and Comparative Examples and those obtained in Reference Examples, the surface texture of the decorative material was evaluated. Twenty randomly selected adults evaluated the surface texture according to the criteria below. The results are presented in Table 1.

AA: Eighteen or more individuals answered that the decorative material had a texture of natural wood.

A: Fifteen to seventeen individuals answered that the decorative material had a texture of natural wood.

B: Eleven to fourteen individuals answered that the decorative material had a texture of natural wood.

C: Ten or fewer individuals answered that the decorative material had a texture of natural wood.

1-3. Static Coefficient of Friction

For each of the decorative materials obtained in Examples and Comparative Examples and those obtained in Reference Examples, the static coefficient of friction was measured at 20 randomly selected points on the surface of the decorative material. At the 20 measuring points, the static coefficient of friction was measured in random directions.

The instrument used to measure the static coefficient of friction was "3D Muse TYPE: 37i" portable friction meter, manufactured by Shinto Scientific Co., Ltd. The slider of the friction meter is a hard chromium-plated aluminum column with a diameter at its bottom of 26 mm. Prior to the measurement, nitrile rubber was attached to the measuring surface of the slider of the friction meter using double-sided adhesive tape ("Thick Double Sided Tape NO. 507," manufactured by Nitto Denko Corporation). The nitrile rubber was AS ONE Corporation's Clean Knoll Nitrile Glove cut to a size somewhat larger than the slider. The nitrile rubber was attached to cover the entire measuring surface of the slider. Any slack in the nitrile rubber was avoided while it was attached.

Based on the values of the static coefficients of friction at the 20 points, the average static coefficient of friction and the standard deviation σ of static coefficients of friction were calculated. The results are presented in Table 1.

1-4. Tactile Feel

For each of the decorative materials obtained in Examples and Comparative Examples and those obtained in Reference Examples, the surface tactile feel of the decorative material was evaluated. Twenty randomly selected adults evaluated the surface tactile feel according to the criteria below. The results are presented in Table 1.

AA: Eighteen or more individuals answered that the decorative material had a tactile feel of natural wood.

A: Fifteen to seventeen individuals answered that the decorative material had a tactile feel of natural wood.

B: Eleven to fourteen individuals answered that the decorative material had a tactile feel of natural wood.

C: Ten or fewer individuals answered that the decorative material had a tactile feel of natural wood.

2. Preparation of Embossing Plates

Embossing plates 1 to 6 were prepared.

Embossing plate 1 was prepared through corrosion etching of a roll of iron with its surface plated with a copper layer and subsequent hard chromium plating of the surface. Embossing plates 2 to 6 were prepared through laser engraving of a roll of iron with its surface plated with a copper layer and subsequent hard chromium plating of the surface.

For each embossing plate, the "range and standard deviation σ of the depths of irregularities," "average and standard deviation σ of the number of gradations in the depths of irregularities," "range of the directions of irregularities (range of the directions in which the irregularities extended when the transverse direction with respect to the embossing plate was defined as) 0°," and "range and standard deviation σ of the lengths of irregularities" are presented in Table 1.

The "average and standard deviation σ of the number of gradations in the depths of irregularities" were calculated through the following steps (1) and (2).

(1) Image data is obtained in which depths from the minimum depth to the maximum depth of the irregularities in the embossing plate have been converted into 256 gradations from 0 to 255.

(2) The average number of gradations by pixel is reported as the number of gradations in the depths of irregularities for that embossing plate. The standard deviation σ of the number of gradations across pixels is reported as the standard deviation σ of the number of gradations in the depths of irregularities for that embossing plate.

3. Preparation of Decorative Materials

Example 1

On a colored base material (a 60-μm thick white polypropylene film), a wood-patterned decorative layer having a total thickness of 1 μm was formed by producing, by multicolored gravure printing, a graphic layer having a conduit groove pattern drawn with black inks and a graphic layer having a pattern of wood bark excluding conduit portions drawn with brown inks.

On the decorative layer, an adhesive agent layer (polyester resin; thickness, 5 μm) was formed. On the adhesive agent layer, a transparent resin layer (a transparent polypropylene resin sheet; thickness, 80 μm) was placed by extrusion laminating. In this manner, a base material layer including a colored base material, a decorative layer, an adhesive agent layer, and a transparent resin layer in this order was obtained.

The transparent resin layer was heated to a softened state, and the surface of the transparent resin layer was embossed using embossing plate 3, prepared in "2. Preparation of Embossing Plates" above, to create an irregular shape on the surface of the transparent resin layer.

Blackish brown filled portion ink was placed on the surface of the transparent resin layer, after which the filled portion ink was scraped away with a doctor blade positioned perpendicular to the base material layer. Through this, an excess of ink was removed, and the ink was pushed into the grooves at the same time. The ink was dried and cured. The filled portion ink contains an acrylic and urethane copolymeric resin as a binder resin, carbon black, quinacridone, and isoindolinone as pigments, and an ultraviolet absorber, a photostabilizer, silica, an anti-settling agent, and a dispersant as additives.

The surface of the transparent resin layer was subjected to corona discharge treatment, and then a 4-μm thick primer layer was formed on the transparent resin layer by applying and drying a primer layer composition as described below.

<Primer Layer Composition>

The primer layer composition is a composition obtained by mixing 100 parts by mass of composition X (a composition obtained by mixing a composition composed of a polycarbonate urethane-acrylic copolymer and an acrylic polyol with hexamethylene diisocyanate in a ratio by mass of 100:5) and a diluting solvent.

On the primer layer, a 5-μm thick surface protection layer was formed by applying a surface protection layer composition as described below and crosslinking and curing the composition through irradiation with electron beams. In this manner, a decorative material of Example 1 was obtained.

<Surface Protection Layer Composition>

An ionizing radiation-curable resin composition, 100 parts (a trifunctional urethane acrylate oligomer with a weight-average molecular weight of 4000)

A matting agent, 15 parts (silica with an average particle diameter of 6 μm)

Example 2

A decorative material of Example 2 was obtained in the same manner as in Example 1, except that the matting agent content of the surface protection layer composition was changed as specified in Table 1.

Example 3 and COMPARATIVE EXAMPLES 1 to 4

Decorative materials of Example 3 and Comparative Examples 1 to 4 were obtained in the same manner as in Example 1, except that the type of embossing plate was changed as specified in Table 1.

REFERENCE EXAMPLES 1 and 2

Boards of natural wood were prepared as decorative materials of Reference Examples 1 and 2.

TABLE 1

| | | | Examples | | | Comparative Examples | | | | Reference Examples | |
|---|---|---|---|---|---|---|---|---|---|---|---|
| | | | 1 | 2 | 3 | 1 | 2 | 3 | 4 | 1 | 2 |
| Embossing plate | Number | | 3 | 5 | 1 | 2 | 4 | 6 | — | — | |
| | Depth of irregularities (μm) | Average | 40~90 | 30~90 | 60~80 | 20~90 | 30~90 | 40~80 | | | |
| | | Standard deviation | 12 | 11 | 2 | 12 | 11 | 8 | | | |
| | Gradations | Average | 75.5 | 74.3 | 81.7 | 93.5 | 86.1 | 63.3 | | | |
| | | Standard deviation | 70.9 | 50.11 | 8.6 | 84.2 | 68.4 | 70.5 | | | |
| | Directions of irregularities | | Random within 90° ± 30° | Random within 90° ± 20° | Random within 90° ± 10° | Random within 0° ± 90° | Random within 90° ± 90° | Random within 90° ± 30° | | | |
| | Lengths of irregularities (cm) | Range | 0.1~30< | 0.1~30< | 0.1~2 | 0.1~6 | 0.1~6 | 0.1~30< | | | |
| | | Standard deviation | Approximately 30 | Approximately 30 | 0.5 | 1.8 | 1.4 | Approximately 30 | | | |
| Amount of matting agent in surface protection layer | | | 15 | 20 | 15 | 15 | 15 | 15 | 15 | | |
| Specular gloss at 20° | | Average | 0.65 | 0.51 | 0.54 | 1.50 | 0.33 | 0.34 | 0.33 | 0.97 | 0.16 |
| | | Standard deviation | 0.143 | 0.125 | 0.081 | 0.082 | 0.067 | 0.052 | 0.044 | 0.142 | 0.070 |

TABLE 1-continued

|  |  | Examples | | | Comparative Examples | | | | Reference Examples | |
| --- | --- | --- | --- | --- | --- | --- | --- | --- | --- | --- |
|  |  | 1 | 2 | 3 | 1 | 2 | 3 | 4 | 1 | 2 |
| Specular gloss at 60° | Average | 5.200 | 4.952 | 4.04 | 11.930 | 3.260 | 3.360 | 3.09 | 4.790 | 1.150 |
|  | Standard deviation | 1.108 | 0.932 | 0.413 | 0.503 | 0.517 | 0.280 | 0.398 | 0.801 | 0.677 |
| Specular glossiness at 85° | Average | 10.28 | 9.55 | 3.07 | 17.21 | 3.52 | 4.95 | 2.41 | 11.97 | 2.86 |
|  | Standard deviation | 2.505 | 2.370 | 1.693 | 0.606 | 0.594 | 0.715 | 0.438 | 3.614 | 2.737 |
| Texture |  | AA | A | A | C | C | C | C | AA | AA |
| Static coefficient of friction | Average | 0.948 | 0.750 | 0.653 | 0.956 | 0.803 | 0.725 | 0.553 | 0.687 | 0.546 |
|  | Standard deviation | 0.178 | 0.22 | 0.278 | 0.125 | 0.24 | 0.204 | 0.251 | 0.265 | 0.248 |
| Tactile feel |  | B | A | A | C | AA | A | A | AA | AA |

As can be seen from Table 1, the decorative materials of the Examples had a texture closely resembling the natural wood used as reference examples.

REFERENCE SIGNS LIST

10: base material layer
11: transparent resin layer
12: adhesive agent layer
13: decorative layer
14: base material
21: groove
22: filled portion
30: primer layer
40: surface protection layer
50: bonding layer
100: decorative material
100A: decorative board
100B: decorative sheet
101: substrate

The invention claimed is:

1. A decorative material having a first surface and a second surface opposite the first surface, the decorative material comprising:
a base material layer and a surface protection layer disposed closer to the first surface than the base material layer is, wherein
the base material layer has a plurality of grooves in a surface thereof closer to the first surface,
at least a subset of the grooves has a filled portion therein, and
an average specular glossiness at 85° of the first surface pursuant to JIS Z8741:1997 is 18% or less, and a standard deviation σ of specular glossiness at 85° of the first surface pursuant to JIS Z8741:1997 is 1.0% or more.

2. The decorative material according to claim 1, wherein the average specular glossiness at 85° is 1.5% or more and 18% or less.

3. The decorative material according to claim 1, wherein the standard deviation σ of specular glossiness at 85° is 1.0% or more and 7.0% or less.

4. The decorative material according to claim 1, wherein an average static coefficient of friction of the first surface is 1.200 or less.

5. The decorative material according to claim 1, wherein a standard deviation σ of static coefficients of friction of the first surface is 0.180 or more.

6. The decorative material according to claim 1, wherein the surface protection layer contains a matting agent.

7. The decorative material according to claim 1, comprising a primer layer between the base material layer and the surface protection layer.

8. The decorative material according to claim 1, wherein the base material layer includes a transparent resin layer, an adhesive agent layer, a decorative layer, and a base material in this order in a direction from the first surface toward the second surface.

9. The decorative material according to claim 1, wherein
an average width of the grooves is 10 μm or more and 2000 μm or less, and
a standard deviation of widths of the grooves is 20 μm or more and 600 μm or less.

10. The decorative material according to claim 1, wherein
an average depth of the grooves is 10 μm or more and 100 μm or less, and
a standard deviation of depths of the grooves is 1 μm or more and 20 μm or less.

11. The decorative material according to claim 1, wherein
an average length of the grooves is 5 mm or more, and
a standard deviation of lengths of the grooves is 5 mm or more.

12. The decorative material according to claim 1, wherein a percentage of the grooves having the filled portion is 80% or more.

13. The decorative material according to claim 1, further comprising a bonding layer disposed closer to the second surface than the base material layer is.

14. The decorative material according to claim 1, wherein the filled portion contains a coloring agent.

15. The decorative material according to claim 1, wherein the filled portion contains a matting agent.

* * * * *